United States Patent [19]

McCutchan et al.

[11] Patent Number: 4,627,587
[45] Date of Patent: Dec. 9, 1986

[54] AIRPLANE SEAT WITH CONVERTIBLE FLOTATION-CUSHION SYSTEM

[75] Inventors: Diane R. McCutchan, 245 Hillview Dr., Fremont, Calif. 94536; Gretchen W. Roeding; Gordon R. Kibby, both of Fremont, Calif.

[73] Assignee: Diane R. McCutchan, Fremont, Calif.

[21] Appl. No.: 632,158

[22] Filed: Jul. 18, 1984

[51] Int. Cl.$^4$ ............................................. B64D 25/04
[52] U.S. Cl. ............................ 244/122 R; 244/118.5; 244/118.6; 441/127; 297/464; 297/444
[58] Field of Search ............. 244/118 S, 122 R, 118.6; 441/125, 126, 127, 130, 132, 114, 119, 122; 297/443, 444, 464, DIG. 1

[56] References Cited

U.S. PATENT DOCUMENTS

| | | | |
|---|---|---|---|
| 1,117,528 | 11/1914 | Solomon | 441/127 |
| 2,724,133 | 11/1955 | Sorrell | 441/127 |
| 2,987,114 | 6/1961 | Klepper | 441/127 |
| 3,154,345 | 10/1964 | Lambrecht | 441/126 |
| 3,516,098 | 6/1970 | O'Link | 441/127 |
| 4,394,783 | 7/1983 | Simmons | 441/127 |

Primary Examiner—Sherman D. Basinger
Assistant Examiner—Rodney Corl
Attorney, Agent, or Firm—Townsend and Townsend

[57] ABSTRACT

An improved cushion of buoyant material for an airplane seat in which the cushion is removably attached to the seat, such as by Velcro strips. The cushion has straps to receive the arms of the passenger sitting on the cushion whereby the passenger can become coupled to the cushion and cause the cushion to be separated from the seat by pulling the cushion away from the seat. The cushion is formed from a number of hinged sections which pivot forwardly and partially around the passenger to stabilize the passenger when the passenger is in the water and coupled to the cushion by the straps. Actuating devices cause the forward pivoting of the hinged sections when the cushion is pulled away from the seat.

5 Claims, 8 Drawing Figures

AIRPLANE SEAT WITH CONVERTIBLE FLOTATION-CUSHION SYSTEM

BACKGROUND OF THE INVENTION

1. Field of the Invention

This invention relates to an improved lifesaving system in an aircraft. Specifically, it forms an integral part of an airplane seat which would serve as a life preserver and an individual body raft in the event of an airplane disaster over water.

2. Description of the Prior Art

At the present time, conventional commercial aircraft, flying over water, is required to carry individual "MAE Wests," (commonly referred to as vests) as well as very large rafts for passengers and crew members.

There are some obvious drawbacks to the conventional forms of life preservation being used in commercial aviation. The individual "MAE Wests" or vests are stowed in a compartment under the passenger seat. The vests must be located by the passenger, unfolded, slipped over the head and under both arms, straps must be belted and one side inflated manually by pulling a string coupled to a small valve controlling a gas flow from a cartridge. The time factor involved in performing these steps is obviously critical, particularly when the passenger is operating under a great deal of stress, panic, disorientation and possible injury. The "MAE Wests" must be serviced on a regular basis to ensure that the gas valves and cartridges are functioning properly.

The very large rafts stowed on the plane, which serve as a back-up to and in conjunction with the "MAE Wests," have proven to be very cumbersome and difficult to negotiate through the exit doors on the aircraft.

The following U.S. patents have some pertinency to the field of chairs or seats having removable pads or cushions: Nos. 1,117,528, 3,154,345, 3,337,164, 3,516,098, 3,620,570, and 3,903,554.

SUMMARY OF THE INVENTION

The present invention proposed is a cushion system designed to replace the inadequate and unsafe methods now in existence. It is an integral part of a passenger seat, but when needed, would serve as a life preserver and an individual raft in the water.

This invention is simplified, provides far more in the area of safety, and eliminates the lengthy steps now needed as described above.

Only two steps are required by the passenger to make this cushion become a flotation system: (1) the passenger places his arms through the straps attached to the cushion; and, (2) the passenger leans forwardly to separate the cushion from the seat body. The passenger is then immediately able to leave the seat body in accordance with instructions from the crew.

The cushion of the present invention comprises a back cushion formed of a buoyant, Coast-Guard approved material to keep the passenger indefinitely afloat in water until rescued. The back cushion is provided with strap means allowing the passenger to become coupled to it. The strap means can have any one of a number of configurations by which the passenger can become attached to the back cushion, allowing the passenger to move away from the stationary seat body quickly toward an exit.

The attachment means can, for instance, be Velcro material to assure a positive connection between the seat body and the back cushion; yet, the back cushion can be immediately separated from the adjacent seat body itself, when the passenger, after being coupled to the strap means, leans forwardly and severs the positive connection.

Other objectives of this invention will become apparent as the following specification progresses, reference being made to the accompanying drawings for an illustration of this invention.

IN THE DRAWINGS

DETAILED DESCRIPTION OF THE PREFERRED EMBODIMENT

Figure 1:
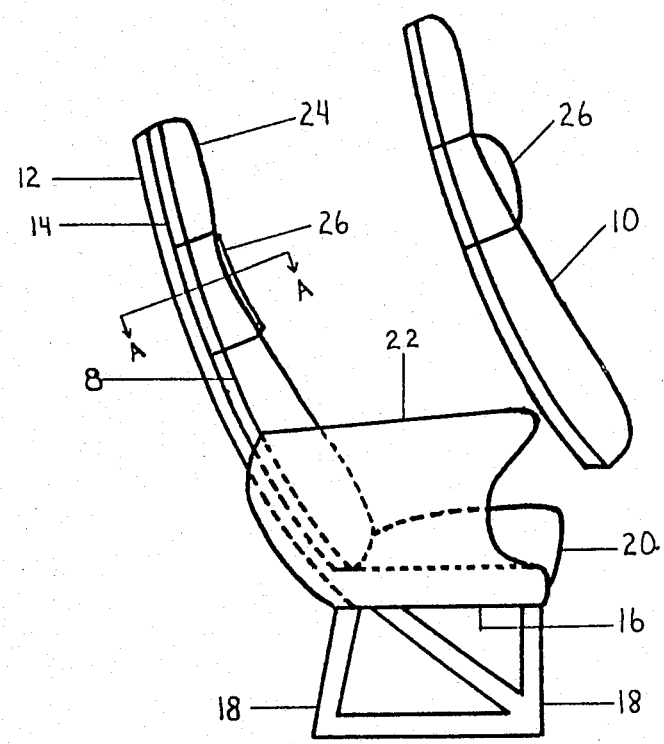
FIG. 1 is a side elevational view of an airplane seat showing a back cushion comprised of a removable flotation-cushion system (body raft or life preserver), the detached section illustrates details of construction.
Figure 1A:
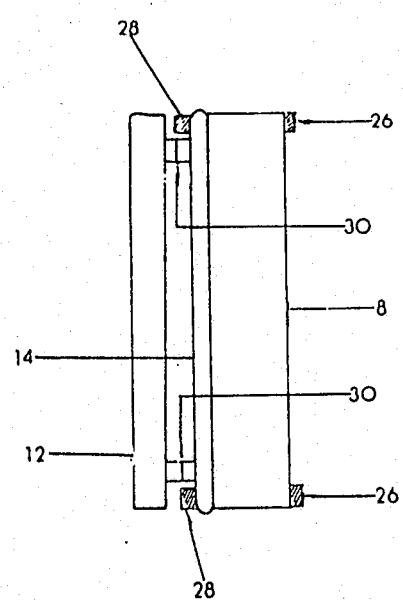
FIG. 1A is a cross-sectional view taken along line A—A of FIG. 1.

In FIG. 1, an airplane seat includes a rigid, rectangular seat back 12 extending upward and slightly inclined from a location near the rear edge of a rigid, generally rectangular bottom seat member 16. Member 16 is mounted by a pair of spaced aircraft seat legs 18 on the floor of an aircraft. A back flotation cushion 8 which has a cushion back pan 14 is removably mounted on seat back 12 and serves not only as cushioned back support for the passenger, but also as a body raft or life preserver, and is hereinafter described as a flotation-cushion system 10.

Member 16 can be of any desired configuration other than rectangular. A seat cushion 20 is mounted on bottom seat member 16. Seat cushion 20 spans the distance between a pair of arm rests 22, only one of which is shown in FIG. 1.

Back flotation cushion 8 includes an upper head rest 24 coupled to generally rectangular back pan 14. Cushion back pan 14 extends upwardly from bottom seat member 16 to the top of the head rest 24. The width of head rest 24 and the main body of back flotation cushion 8 is substantially the same as that of cushion back pan 14. The lower end of back flotation cushion 8 terminates at a location near the upper surface of bottom seat cushion 20. Back flotation cushion 8 could be integral with seat bottom cushion 20, if desired.

Back flotation cushion 8 in conjunction with back pan 14, comprises a removable flotation-cushion system 10. Thus, as hereinafter described, the removable flotation-cushion system 10 can be used as a body raft or life preserver in the event of a crash landing of the aircraft on a body of water which requires that the passenger in the airplane seat be provided with a life preserver.

Although any suitable flotation material can be used for system 10, the material proposed at this time is known as "Ensolite" and can be especially adapted for this purpose. It is made and sold by UniRoyal Corporation, Expanded Products Department, Mishawaka, Ind. 46544. This material is proposed because it has the following properties: the material is a closed-cell vinyl sponge material which will not absorb air or water, yet has good flotation capability even when it is torn; and the material is light, dimensionally stable, can easily be worked, and has a high degree of fire retardancy. The material could be covered with a seat cover or used alone as the surface can easily be washed and is mildew resistant.

To reinforce the back flotation cushion system 10, back pan 14 is attached in any suitable manner to the rear face of the back flotation cushion 8. The back pan 14 can be of sheet metal or plastic and may be slightly flexible, if desired. An adhesive can be used to attach the pan 14 to the rear face of the back flotation-cushion 8. The dimensions of back pan 14 are substantially the same as the corresponding dimensions of the back flotation cushion 8.

Figure 2:
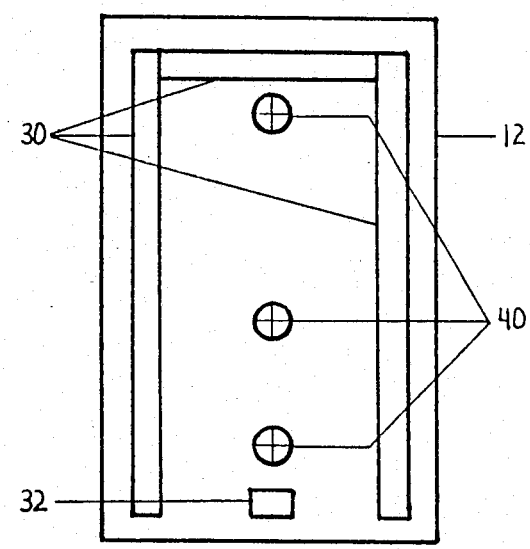
FIG. 2 is a front view of a part of the permanent airplane seat showing the attachment means thereon for releasably attaching the flotation-cushion system to the permanent airplane seat.

Back flotation-cushion system 10 is removably mounted by attachment means in any suitable manner on the front face of the seat back 12. For purposes of illustration, strips 30 of Velcro material are used as the attachment means. In FIG. 2, three strips of Velcro pile material are secured to the front face of seat back 12. These strips are releasably attached to corresponding Velcro mat strips (FIG. 2) on the rear face of cushion back pan 14. Velcro pad 32 is on the lower margin of cushion back pan 14 for mating with a corresponding Velcro pad on seat back 12, as shown in FIG. 2.

When the removable flotation-cushion system 10 is moved into a position adjacent to the permanent seat member 12 and pressed against it, the Velcro attachment means on back pan 14 and aircraft seat back 12 cooperate with each other to releasably connect system 10 in an operational position. Thus, the flotation-cushion system 10 can function in the normal manner to provide a back support for a passenger in the aircraft seat.

The removable flotation-cushion system 10 is provided with retractable or resilient straps 26 for permitting a person sitting in the seat to become removably attached to the flotation-cushion system 10 in case of an emergency. In this way, the removable flotation-cushion system 10 can be used as a body raft or life preserver once it is separated from the permanent aircraft seat back 12. The ends of the straps are fixed in some suitable manner to system 10 so that the straps can form arm-receiving loops 26 shown in FIG. 1.

Figure 3:
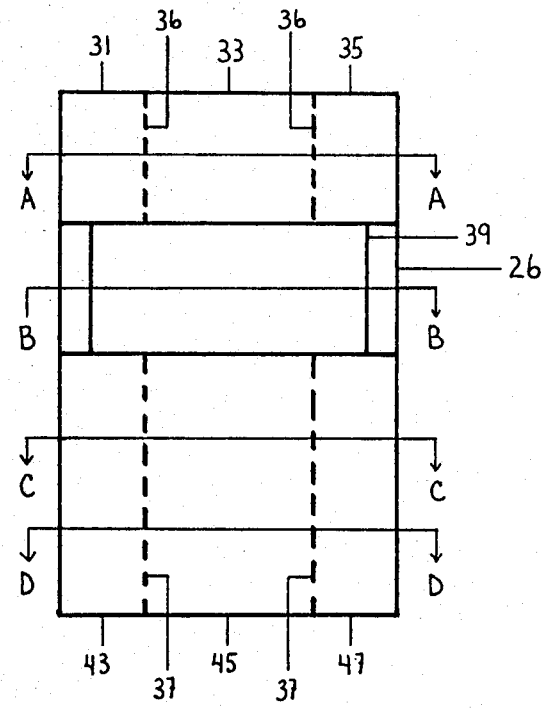
FIG. 3 is a front view of the flotation-cushion system showing certain sections of the cushion being of flotation material and pivotal relative to the non-flotation center section of the system.
Figure 3A:
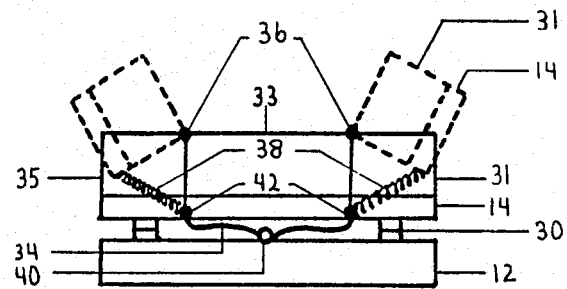
FIGS. 3A and 3B are cross-sectional views taken along lines A—A and B—B, respectively, of FIG. 3.
Figure 3B:
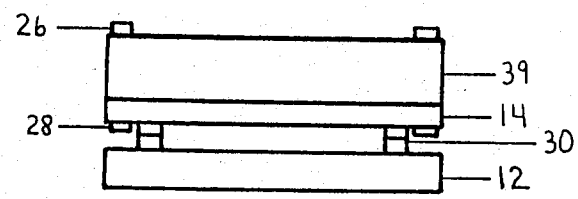
Figure 3C:
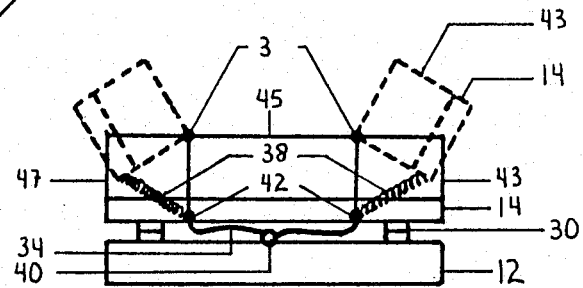
FIG. 3C represents the identical cross-sections taken along lines CC and DD, respectively, of FIG. 3.

To provide stabilization of the passenger when the passenger is attached to the flotation-cushion system 10 and separated from the seat back 12, cushion system 10 is formed in sections, such as generally rectangular sections 31, 33, 35, 39, 43, 45 and 47 as shown in FIG. 3. All sections except sections 39 and 45 are of flotation material; whereas, sections 39 and 45 are minimum flotation or non-flotation material. Sections 33, 39, and 45 are permanently joined together; whereas, sections 31 and 35 are hinged along lines 36 to section 33, and sections 43 and 47 are hinged along hinge lines 37 to section 45. Thus, sections 31 and 35 can pivot forwardly as shown in FIG. 3A, and sections 43 and 47 can pivot forwardly relative to section 45 as shown in FIG. 3C.

A release mechanism 42 is provided at the rear of system 10 at the junction between section 33 and section 31 and at the junction between section 33 and section 35. Similarly, two release mechanisms 42 are secured at the rear facing cushion system 10 at the junction between section 45 and section 43 and two release mechanisms 42 at the junction between section 45 and section 47. Each release mechanism 42 is connected by a lanyard 34 to a respective attachment point 40 on the front face of seat 12.

Each release mechanism 42 includes a spring 38 embedded between adjoining cushion sections and providing a means for pushing the pivotal cushion section forward around the passenger. The locking-release mechanism is designed to keep each spring compressed until activated as described below.

Figure 4:
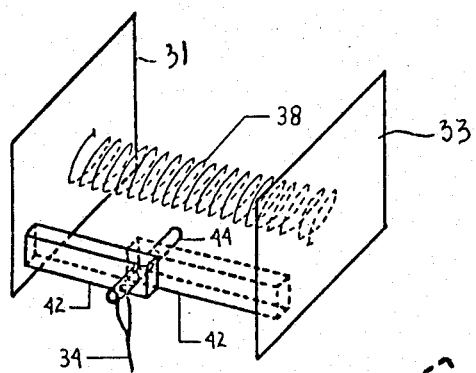
FIG. 4 is a schematic view of a release mechanism forming a part of the seat of the present invention.

The release mechanism is comprised of two inflexible bars 42 which are locked together by pin 44 as shown in FIG. 4. Pin 44 is connected to lanyard 34 which, in turn, is connected to the permanent aircraft seat back 12 at attachment point 40.

The release mechanism is activated as follows:

When the passenger puts his arms through the straps 26 and then leans forward with a tugging motion, he will trigger each lanyard 34 which is attached at point 40 to the permanent aircraft seat back 12; this action will cause the corresponding locking pin 44 to be pulled out of its locking position so that the corresponding spring 38 is in a released position forcing corresponding cushion parts to pivot forward around the passenger thus forming the flotation cushion.

A coil spring 38 is provided for each of the movable sections 31 and 35; and two coil springs 38 are provided for each of the movable sections 43 and 47. Each spring is carried in a bore in the adjacent central section 33 or 45. The compressed spring is freed and expands upon actuation of the corresponding release mechanism 42. This expansion of each spring forces the corresponding pivotal section into the dashed line position shown in FIG. 3A or 3C. Sections 31, 35, 43 and 47 thus pivot out of the plane of sections 33 and 39, thereby providing a center of buoyancy for the person coupled to system 10 such that the person will remain upright in the water.

Separating the flotation-cushion system 10 from the permanent aircraft seat back 12 is accomplished by placing the arms through the loops formed by straps 26 provided on the flotation-cushion system 10 and then by leaning forward with a tugging motion to separate the Velcro attachment means 30 and 32. At the time of separation between the flotation-cushion system 10 and aircraft seat back 12, the locking-release mechanisms 42 will be actuated by pulling on the lanyards, deploying sections 31, 35, 43 and 47 into the dashed line positions of FIGS. 3A and 3C, and thereby placing the cushion 10 into a safe flotation position.

Straps 26 extend downward from the shoulder portion of system 10 below head rest 24 and terminate at the bottom portion of section 39. The straps 26 will be retracted until their use is required. The straps 26 will be accessible on the flotation-cushion system 10 as shown in FIG. 1 which shows only one strap 26. The retractable straps 26 will be secured in the strap retractable system 28 until their usage is required.

FIG. 2 shows the attachment points 40 for the locking-release mechanisms 42. The operation of the locking-release mechanisms 42 is described above with reference to FIGS. 3A and 3C. The purpose of locking-release mechanisms 42 is to deploy sections 31, 35, 43 and 47 of the flotation-cushion system 10. Once the flotation-cushion system 10 is separated from the permanent aircraft body seat 12 the locking-release mechanisms 42 will release the springs 38 forcing sections 31, 35, 43 and 47 into their deployed positions as shown in dashed lines in FIGS. 3A and 3C.

What is claimed is:

1. An airplane passenger seat comprising:
 a seat body having a back member and a seat member;
 a back cushion;
 means for removably attaching the back cushion to the back member of the seat body, said back cushion having a central section and a number of side sections pivotally mounted on the central section, the side sections being initially coplanar with the central section, the side sections being of buoyant material and the central section having a buoyancy less than that of the side sections, said attaching means including a release mechanism for each of the side sections respectively, each release mechanism having means to urge a respective side section out of the plane of the central section as the back cushion is separated from the back member of the seat body; and
 means coupled to the back cushion for removably securing the back cushion to a passenger sitting on the seat member.

2. An airplane passenger seat as set forth in claim 1, wherein said means of each release mechanism includes a spring for biasing the respective side section out of the plane of the central section, each release mechanism being operable to release the corresponding spring and cause it to exert a bias force on the corresponding side section, and means for actuating the release mechanism when the back cushion is separated from the back member.

3. An airplane passenger seat as set forth in claim 3, wherein said actuating means for each release mechanism includes a lanyard secured at one end thereof to the back member and at the opposite thereof to the corresponding release mechanism.

4. An airplane passenger seat as set forth in claim 1, wherein the back cushion is generally rectangular, and having upper side corners and lower side corners, the side sections being at respective corners of the back cushion.

5. An airplane seat as set forth in claim 1, wherein each release mechanism includes a releasable pin.

* * * * *